(12) United States Patent
Chen

(10) Patent No.: US 9,438,118 B2
(45) Date of Patent: Sep. 6, 2016

(54) EFFICIENT BOOST-BUCK CONVERTER AND CONTROL METHOD THEREOF

(71) Applicant: Silergy Semiconductor Technology (Hangzhou) LTD, Hangzhou, ZheJiang Province (CN)

(72) Inventor: Wei Chen, Saratoga, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 130 days.

(21) Appl. No.: 14/159,987

(22) Filed: Jan. 21, 2014

(65) Prior Publication Data

US 2014/0210437 A1 Jul. 31, 2014

(30) Foreign Application Priority Data

Jan. 29, 2013 (CN) .......................... 2013 1 0036227

(51) Int. Cl.
*H02M 3/158* (2006.01)
(52) U.S. Cl.
CPC ......... *H02M 3/1584* (2013.01); *H02M 3/1582* (2013.01)
(58) Field of Classification Search
CPC .................... H02M 3/1582; H02M 3/1584
USPC ....................................................... 323/271
See application file for complete search history.

(56) References Cited

U.S. PATENT DOCUMENTS

| 7,265,524 | B2* | 9/2007 | Jordan | H02M 3/158 323/225 |
| 8,461,814 | B2 | 6/2013 | Peron | |
| 2012/0049819 | A1* | 3/2012 | Mao | H02J 1/102 323/282 |
| 2012/0134180 | A1* | 5/2012 | Watanabe et al. | 363/17 |
| 2012/0262142 | A1 | 10/2012 | Chen et al. | |
| 2012/0313607 | A1 | 12/2012 | Chen et al. | |

FOREIGN PATENT DOCUMENTS

CN          101425747 A      5/2009

* cited by examiner

*Primary Examiner* — Fred E Finch, III
*Assistant Examiner* — Rafael O De Leon Domenech
(74) *Attorney, Agent, or Firm* — Michael C. Stephens, Jr.

(57) ABSTRACT

In one embodiment, a boost-buck converter can include: (i) first and second switches coupled in series between input and an output of the boost-buck converter; (ii) a first inductor coupled to the input and third and fourth switches, where the third switch is coupled to ground, and the fourth switch is coupled to the output; (iii) a second inductor coupled to the output and a common node of the first and second switches; and (iv) a control circuit configured to control switching of the first, second, third, and fourth switches according to the input and output voltages, such that the boost-buck converter operates in at least one of: a buck mode and a boost mode.

16 Claims, 8 Drawing Sheets

EFFICIENT BOOST-BUCK CONVERTER AND CONTROL METHOD THEREOF

RELATED APPLICATIONS

This application claims the benefit of Chinese Patent Application No. 201310036227.7, filed on Jan. 29, 2013, which is incorporated herein by reference in its entirety.

FIELD OF THE INVENTION

The present invention relates to power supplies, and more particularly to an efficient boost-buck converter with an associated control method.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. In this way, the output voltage and/or the output current of the switching power supply can be maintained as substantially constant. Therefore, the selection and design of the particular control circuitry and approach is very important to the overall performance of the switching power supply. Thus, using different detection signals and/or control circuits can result in different control effects on power supply performance.

SUMMARY

In one embodiment, a boost-buck converter can include: (i) first and second switches coupled in series between input and an output of the boost-buck converter; (ii) a first inductor coupled to the input and third and fourth switches, where the third switch is coupled to ground, and the fourth switch is coupled to the output; (iii) a second inductor coupled to the output and a common node of the first and second switches; and (iv) a control circuit configured to control switching of the first, second, third, and fourth switches according to the input and output voltages, such that the boost-buck converter operates in at least one of: a buck mode and a boost mode.

In one embodiment, a method of controlling a boost-buck converter can include: (i) receiving a voltage from an input of the boost-buck converter; (ii) receiving a voltage from an output of the boost-buck converter; (iii) controlling switching of first, second, third, and fourth switches according to the input and output voltages such that the boost-buck converter operates in at least one of: a buck mode and a boost mode; and (iv) where the boost-buck converter comprises the first and second switches coupled in series between the input and ground, a first inductor coupled to the input, the third switch coupled between the first inductor and ground, the fourth switch coupled between the first inductor and the output, and a second inductor coupled to a common node of the first and second switches and the output.

Embodiments of the present invention can provide several advantages over conventional approaches, as may become readily apparent from the detailed description of preferred embodiments below.

DETAILED DESCRIPTION

Figure 1A:
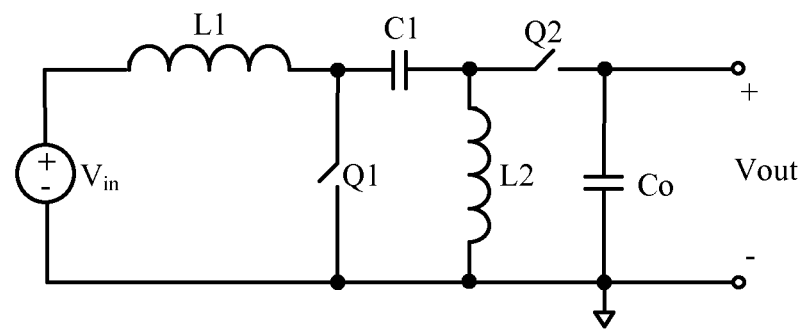
FIGS. 1A-1E are schematic block diagrams of example power conversion circuits.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A buck converter is a voltage step down and current step up converter. The simplest way to reduce a voltage of a DC supply is to use a linear regulator. However, linear regulators typically waste energy as they operate by dissipating excess power as heat. On the other hand, buck converters can be relatively efficient (e.g., 95% or higher for integrated circuits), and as such may be useful for various applications, such as converting a main voltage in a computer (e.g., 12V in a desktop, 12-24V in a laptop) down to from about 0.8V to about 1.8V for use by the processor. The buck converter controls the current in an by two switches (e.g., two transistors or a transistor and a diode).

A boost converter (step-up converter) is a DC-to-DC power converter with an output voltage greater than its input voltage. It is also in a class of switched-mode power supply (SMPS) containing at least two semiconductor switches (e.g., a diode and a transistor), and at least one energy storage element (e.g., a capacitor, an inductor, or the two in combination). Filters made of capacitors (sometimes in combination with inductors) can be added to the output of the converter to reduce output voltage ripple.

A buck-boost converter is a type of DC-to-DC converter that has an output voltage magnitude that is either greater than or less than the input voltage magnitude. A buck-boost converter can have one of two main topologies, both of which can produce a range of output voltages, from an output voltage much larger (in absolute magnitude) than the input voltage, down to almost zero. In an inverting topology, the output voltage is of an opposite polarity than the input, and can have an output voltage that is adjustable based on the duty cycle of the switching transistor. One possible drawback of this inverting topology converter is that the switch does not have a terminal at ground, which can complicate the driving circuitry. In any case, if the power supply (e.g., a battery) is isolated from the load circuit, the supply and diode polarity can simply be reversed, and the switch can be on either the ground side or the supply side.

In another topology, a buck (step-down) converter can be followed by a boost (step-up) converter. In this case, the output voltage is of the same polarity as the input voltage, and the output voltage can be lower or higher than the input voltage. Such a non-inverting buck-boost converter may use a single inductor for both the buck inductor and the boost inductor.

FIGS. 1A-1E show schematic block diagrams of example power conversion circuits. When a power supply voltage or battery power is applied in unstable conditions (e.g., vehicle-mounted applications), the input voltage of the power supply may be higher than, lower than, or approximate to the output voltage. In order to provide a stable power supply to the load at the output, both single-stage power conversion and two-stage power conversion solutions have been utilised. In FIGS. 1A-1E, several power conversion approaches are shown. However, the conduction loss of these example power converters can be relatively high, resulting in limited power supply efficiency.

Figure 1B:
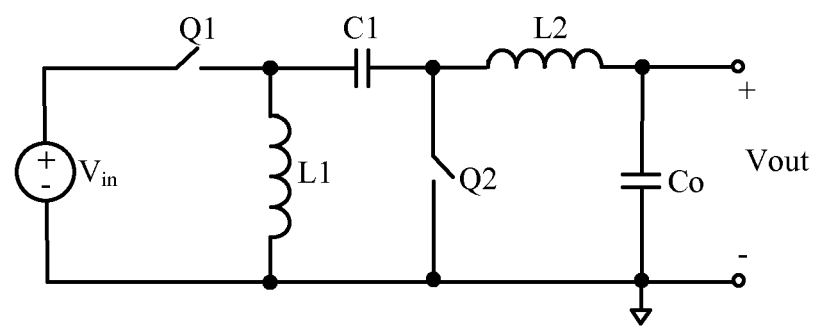

As shown in FIGS. 1A and 1B, the conduction loss $P_{cond}$ of a SEPIC power conversion circuit and a ZETA power conversion circuit that include inductor L1, switch Q1, capacitor C1, inductor L2, switch Q2, and output capacitor Co during operation is as shown below in equation (1).

$$P_{cond} \cong I_{in}^2 R_{L1} + I_{out}^2 R_{L2} + (I_{in}+I_{out})^2 [DR_{Q1}+(1-D)R_{Q2}] \quad (1)$$

For example $I_{in}$ can denote input current, $I_{out}$ can denote output current, $R_{L1}$ can denote the equivalent resistance of inductor L1, $R_{L2}$ can denote an equivalent resistance of inductor L2, $R_{Q1}$ can denote a conduction resistance of switch Q1, $R_{Q2}$ can denote a conduction resistance of switch Q2, and D can denote a duty cycle of switch Q1. From equation (1), it can be seen that the conduction loss of the two power conversion circuits is in direct proportion to $(I_{in}+I_{out})^2$, and the withstand or breakdown voltage of switches Q1 and Q2 is $V_{in}+V_{out}$. Also, $V_{in}$ is the is the input voltage of the SEPIC (or ZETA) power conversion circuit, and $V_{out}$ is the output voltage of the SEPIC (or ZETA) power conversion circuit, and either approach may not be suitable for high-efficiency conversion applications.

Figure 1C:
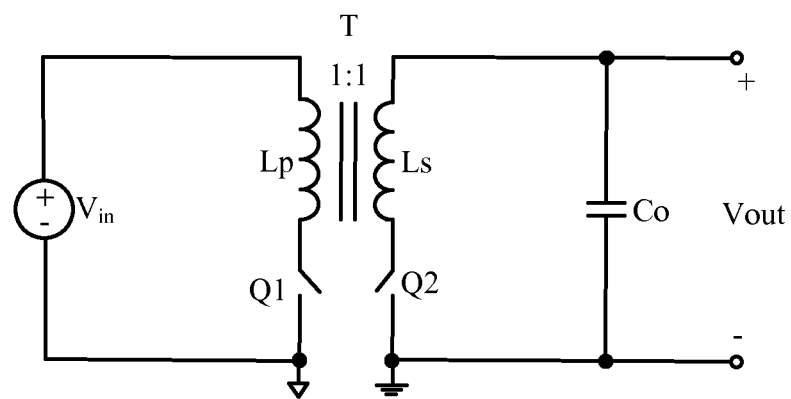

As shown in FIG. 1C, the conduction loss $P_{cond}$ of a synchronous rectifier flyback power conversion circuit that includes isolated transformer T, switch Q1, switch Q2, and output capacitor Co during operation is shown below in equation (2).

$$P_{cond} \cong \frac{I_{in}^2}{D}(R_{Q1}+R_{Lp}) + \frac{I_{out}^2}{1-D}(R_{Q2}+R_{Ls}) \quad (2)$$

The same or similar elements in FIGS. 1A-1E are denoted by the same reference numbers or indicators, and corresponding symbols in equations (1) and (2) can denote the same thing. For example, $R_{LP}$ can denote an equivalent resistance of a primary side winding of transformer T, and $R_{LS}$ can denote an equivalent resistance of a secondary winding of transformer T. To facilitate computation, switch Q1 and switch Q2 can be treated as the same switch (i.e., $R_{Q1}=R_{Q2}$). Also, the turns of primary and secondary windings of transformer T can be the same. Then, $R_{LP}=R_{LS}$, and the current of the primary and secondary windings can be $$I_{LP}=I_{LS}=\frac{I_{in}}{D}=\frac{I_{out}}{1-D},$$

which may be substituted equation (2) to derive equation (3) as below.

$$P_{cond} \cong (I_{in}+I_{out})^2(R_{Q1}+R_{LP}) \quad (3)$$

Figure 1D:
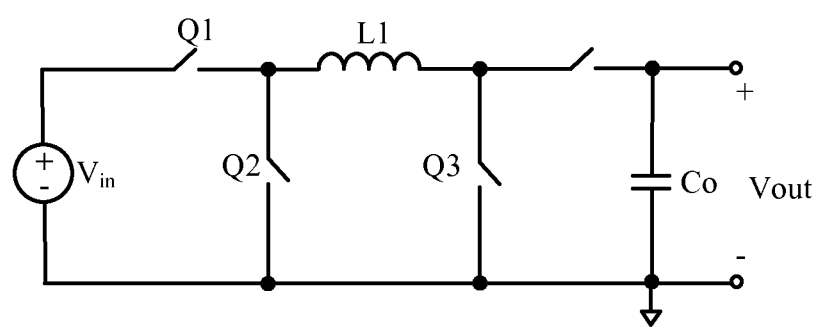

From equation (3), it can be seen that the conduction loss of such a two-stage flyback power conversion circuit may also be in direct proportion to $(I_{in}+I_{out})^2$, resulting in similar conduction losses and conversion efficiency limitations. FIG. 1D shows a buck-boost circuit that includes switches Q1, Q2, Q3, Q4, and inductor L1. When the input voltage is higher than the output voltage, the circuit can operate in a buck mode, and its conduction loss during operation can be represented as in equation (4) below.

$$P_{cond}=I_{out}^2[R_{Q4}+R_{L1}+D_1R_{Q1}+(1-D)R_{Q2}] \quad (4)$$

For example, $D_1$ can be the duty cycle of switch Q1. When the input voltage is less than the output voltage and the circuit can operate in a boost mode, its conduction loss during operation can be represented as in equation (5) below.

$$P_{cond}=I_{in}^2[R_{L1}+R_{L1}+R_{Q1}D_2R_{Q3}+(1-D_2)R_{Q4}] \quad (5)$$

For example, $D_2$ can be the duty cycle of switch Q2. From equations (4) and (5), it can be seen that the conduction loss during operation may be in direct proportion to the sum of the equivalent resistance of the two switches, thus also resulting in relatively large conduction losses.

Figure 1E:
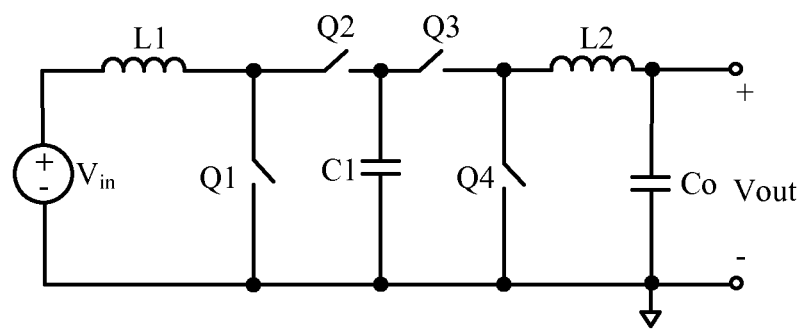

Referring to FIG. 1E, the conduction loss of the boost-buck circuit that includes switches Q1, Q2, Q3, Q4, and inductor L1 during operation can be as shown in equation (6) below.

$$P_{cond}=I_{in}^2[R_{L1}+D_1R_{Q1}+(1-D)R_{Q2}]+I_{out}^2[R_{L2}+D_2R_{Q3}+(1-D_2)R_{Q4}] \quad (6)$$

From equation (6), it can be seen that the conduction loss of the boost-buck power conversion circuit may be greater than the conduction loss of the buck-boost power conversion circuit shown in FIG. 1D, and its conduction loss may not only be in direct proportion to the sum of the equivalent resistances of the two switches, but can also include the resistance loss of the two inductors. Thus, conduction losses of such example power conversion circuits can be relatively large, and the efficiency of the power supply can thus be limited. In particular embodiments, a power conversion circuit can realize boost and buck configurations and/or modes, and may also have relatively low conduction losses and relatively high conversion efficiency.

In one embodiment, a boost-buck converter can include: (i) first and second switches coupled in series between input and an output of the boost-buck converter; (ii) a first inductor coupled to the input and third and fourth switches, where the third switch is coupled to ground, and the fourth switch is coupled to the output; (iii) a second inductor coupled to the output and a common node of the first and second switches; and (iv) a control circuit configured to control switching of the first, second, third, and fourth switches according to the input and output voltages, such that the boost-buck converter operates in at least one of: a buck mode and a boost mode.

Figure 2:
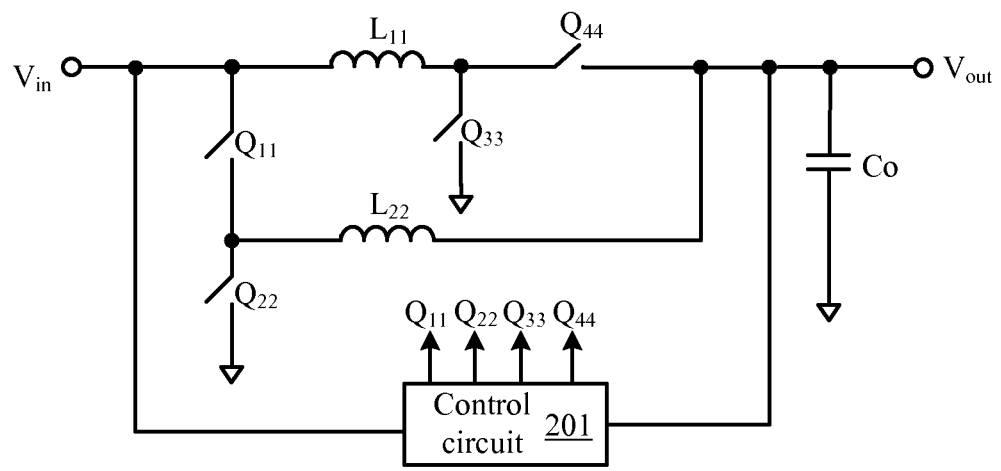
FIG. 2 is a schematic block diagram of a first example boost-buck converter in accordance with embodiments of the present invention.

Referring now to FIG. 2, shown is a schematic block diagram of a first example boost-buck converter in accordance with embodiments of the present invention. This particular example boost-buck converter can include inductors $L_{11}$ and $L_{22}$. Inductor $L_{11}$ can connect to the input of the boost-buck converter. Switches $Q_{11}$ and $Q_{22}$ can be connected in series between the input of the boost-buck converter and ground. The "switches" as described herein can be any type of transistor (e.g., BJT transistor, MOS transistor, etc.) or diode. Inductor $L_{22}$ can connect to a common node of switches $Q_{11}$ and switch $Q_{22}$, and to the output of the boost-buck converter. Switch $Q_{33}$ can connect to inductor $L_{11}$ and ground, and switch $Q_{44}$ can connect between inductor $L_{11}$ and to the output of the boost-buck converter. Also, capacitor Co can be the output capacitor coupled between the output and ground.

This example boost-buck converter can also include control circuit 201. For example, control circuit 201 can include any suitable switch control circuitry (e.g., pulse-width modulation [PWM] control, other switch duty cycle control, etc.), as well as other circuit components (e.g., comparators, amplifiers, etc.). Control circuit can receive input voltage $V_{in}$ and output voltage $V_{out}$ of the boost-buck converter. Based on input voltage $V_{in}$ and output voltage $V_{out}$, control circuit 201 can control switching or switch actions switches $Q_{11}$, $Q_{22}$, $Q_{33}$, and $Q_{44}$ such that the boost-buck converter can operate in a boost mode or the buck mode. For example, control circuit 201 can include a comparator for comparing a voltage value of input voltage $V_{in}$ against output voltage $V_{out}$.

In some cases, the boost-buck converter can operate in a combination mode (e.g., simultaneous boost and buck modes), or can alternate between boost and buck modes. Control circuit 201 can control the operation mode (e.g., boost mode and/or buck mode) of the boost-buck converter based on a comparison of input voltage $V_{in}$ against output voltage $V_{out}$. When control circuit 20 determines that input voltage $V_{in}$ of the boost-buck converter is greater (e.g., in absolute value) or higher than its output voltage $V_{out}$, control circuit 201 can control switches $Q_{33}$ and $Q_{44}$ to be off, and the boost-buck converter can operate in the buck mode by controlling switching of switches $Q_{11}$ and $Q_{22}$. Also, during the buck operating mode, switch $Q_{44}$ may employ reverse blocking (e.g., via a body diode) in order to prevent the output current from returning to the input.

When control circuit 201 determines that input voltage $V_{in}$ of the boost-buck converter is smaller (e.g., in absolute value) or less than its output voltage $V_{out}$, control circuit 201 can control switches $Q_{11}$ and $Q_{22}$ to turn off, and can configure the boost-buck converter to operate in the boost mode by controlling switching of switch is $Q_{33}$ and $Q_{44}$. Also, during the boost operating mode, switch $Q_{11}$ may utilize reverse blocking (e.g., via a body diode) to prevent output current from returning to the input.

Another way for the control circuit 201 to control the boost-buck converter to operate in boost mode is during the process when input voltage $V_{in}$ is being reduced, the duty cycle of switch $Q_{11}$ reaches 100%, and when control circuit 201 detects that the average current of switch $Q_{11}$ becomes negative. In this particular case, control circuit 201 can also control switches $Q_{11}$ and $Q_{22}$ to turn off, and can configure the boost-buck converter to operate in the boost mode by controlling switching of switch is $Q_{33}$ and $Q_{44}$.

When the control circuit 201 detects that input voltage $V_{in}$ of the boost-buck converter is approximately a same level as (e.g., within a predetermined amount of) output voltage $V_{out}$, control circuit 201 can control switching of switches $Q_{11}$, $Q_{22}$, $Q_{33}$, and $Q_{44}$, such that the boost-buck converter operates under the boost and buck modes alternatively, or simultaneously operates under both the boost and buck modes, in order to maintain output voltage $V_{out}$ as substantially constant. For example, switches $Q_{11}$ and $Q_{22}$, and inductor $L_{11}$ can form a buck power conversion circuit. Also for example, switches $Q_{33}$ and $Q_{44}$ as well as inductor $L_{22}$ can form a boost power conversion circuit, which can provide at least a portion of energy for the output.

When control circuit 201 controls the boost-buck converter to operate in the buck mode, its conduction loss $P_{cond}$ during operation can be as shown in equation (7) below.

$$P_{cond}=I_{out}^2[R_{L22}+D_1 R_{Q11}+(1-D_1)R_{Q22}] \quad (7)$$

For example, $I_{out}$ can denote an output current of the boost-buck converter, $R_{L22}$ can denote an equivalent resistance of inductor $L_{22}$, $R_{Q11}$ can denote a conduction resistance of switch $Q_{11}$, $R_{Q22}$ can denote a conduction resistance of switch $Q_{22}$, and $D_1$ can denote the duty cycle of switch $Q_{11}$. When control circuit 201 controls the boost-buck converter to operate in the boost mode, its conduction loss $P_{cond}$ during operation can be as shown in equation (8) below.

$$P_{cond}=I_{in}^2[R_{L11}+D_2 R_{Q33}+(1-D_2)R_{Q44}] \quad (8)$$

For example, $I_{in}$ can denote an input current of the boost-buck converter, $R_{L11}$ can denote an equivalent resistance of inductor $L_{11}$, $R_{Q33}$ can denote a conduction resistance of switch $Q_{33}$, $R_{Q44}$ can denote a conduction resistance of switch $Q_{44}$, and $D_2$ can denote the duty cycle of switch $Q_{33}$. From equations (7) and (8), it can be seen that conduction losses of an efficient boost-buck converter in particular embodiments can be reduced as compared to other example power conversion circuits, which can improve the operating efficiency of the power supply.

A boost-buck converter of particular embodiments may also be applied in cases where the load varies transiently (e.g., step changes or relatively fast changes in the output load). When the output load of the converter varies transiently, due to the transient variation of the output voltage, control circuit 201 may also control a power conversion circuit that may not initially function (e.g., a slow transient response) to assist a power conversion circuit that is functioning in order to obtain an improved transient output response. Thus, two or more power conversion circuits can be coupled to a same control circuit 201 in some applications.

Figure 3:
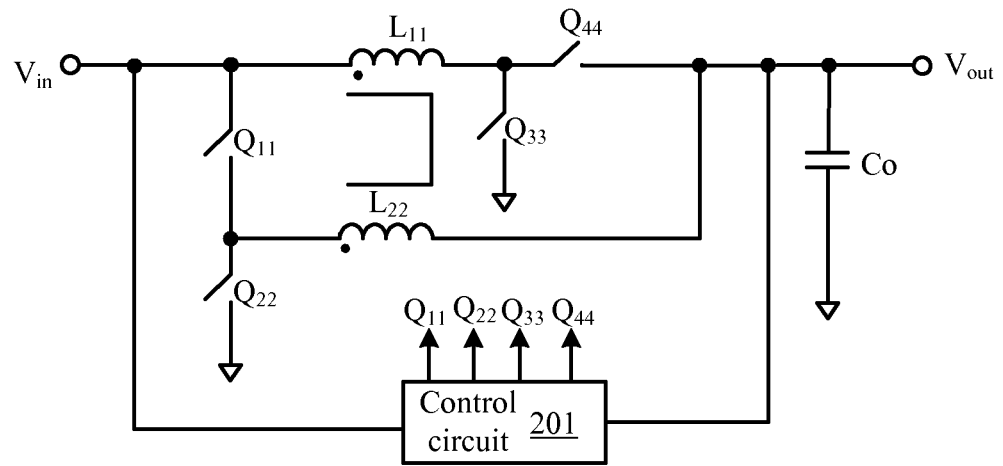
FIG. 3 is a schematic block diagram of a second example boost-buck converter in accordance with embodiments of the present invention.

Referring now to FIG. 3, shown is a schematic block diagram of a second example boost-buck converter in accordance with embodiments of the present invention. In this particular example, inductors $L_{11}$ and $L_{22}$ can be coupled together by way of coupling (e.g., for mutual inductance). This arrangement may reduce printed-circuit board (PCB) area, as well as number of components and parts, to further improve integration and reduce costs.

In one embodiment, a method of controlling a boost-buck converter can include: (i) receiving a voltage from an input of the boost-buck converter; (ii) receiving a voltage from an output of the boost-buck converter; (iii) controlling switching of first, second, third, and fourth switches according to the input and output voltages such that the boost-buck converter operates in at least one of: a buck mode and a boost mode; and (iv) where the boost-buck converter comprises the first and second switches coupled in series between the input and ground, a first inductor coupled to the input, the third switch coupled between the first inductor and ground, the fourth switch coupled between the first inductor and the output, and a second inductor coupled to a common node of the first and second switches and the output.

Figure 4:
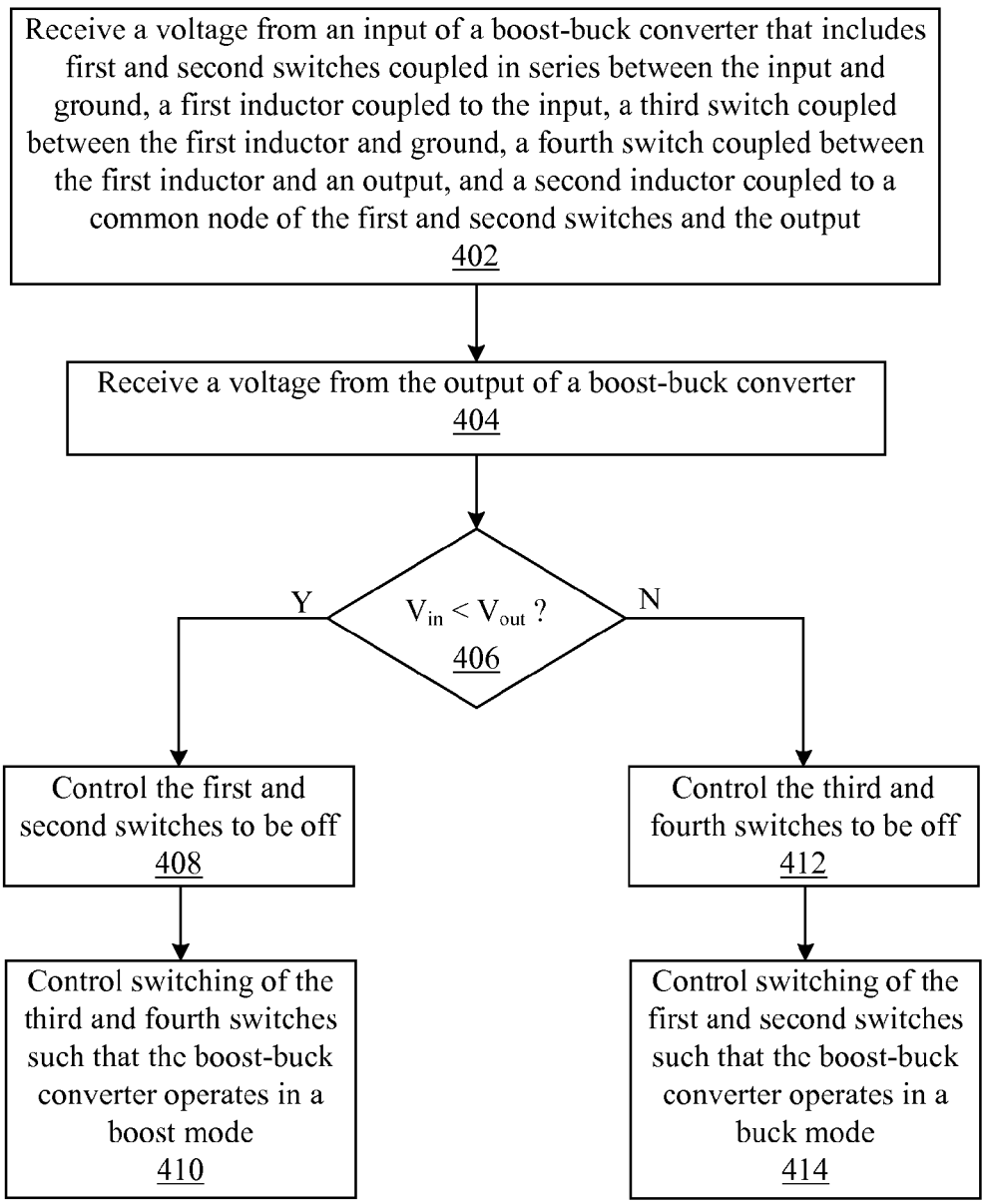
FIG. 4 is a flow diagram of an example method of controlling a boost-buck converter, in accordance with embodiments of the present invention.

Referring now to FIG. 4, shown is a flow diagram of an example method of controlling a boost-buck converter, in accordance with embodiments of the present invention. At 402, a voltage (e.g., $V_{in}$) from an input of a boost-buck converter can be received (e.g., in control circuit 201). As discussed above (see, e.g., FIGS. 2 and 3), the boost-buck converter can include switches $Q_{11}$ and $Q_{22}$ coupled in series between the input and ground, inductor $L_{11}$ coupled to the input, switch $Q_{33}$ coupled between inductor $L_{11}$ and ground, switch $Q_{44}$ coupled between inductor $L_{11}$ and an output of the converter, and inductor $L_{22}$ coupled to a common node of switches $Q_{11}$ and $Q_{22}$ and the output.

At 404, a voltage (e.g., $V_{out}$) from the output of the boost-buck converter can be received (e.g., in control circuit 201). Of course, the input and output voltages of the boost-buck converter can be simultaneously received in control circuit 201. At 406, a comparison (e.g., the comparator circuit) of the input and output voltages can be performed. If the input voltage is less (e.g., in absolute value) than the output voltage, at 408 switches $Q_{11}$ and $Q_{22}$ can be turned off, and at 410 switches $Q_{33}$ and $Q_{44}$ can be controlled such that the boost-buck converter operates in a boost mode. However, if the input voltage is greater (e.g., in absolute value) than the output voltage, at 412 switches $Q_{33}$ and $Q_{44}$ can be turned off, and at 414 switches $Q_{11}$ and $Q_{22}$ can be controlled such that the boost-buck converter operates in a buck mode.

In addition, when it is detected that the input voltage of the boost-buck converter is approximately a same level as (e.g., within a predetermined amount of) the output voltage, switching of switches $Q_{11}$, $Q_{22}$, $Q_{33}$, and $Q_{44}$ can be controlled such that the boost-buck mode alternatively operates in the boost and buck modes, or simultaneously operates in the boost and buck modes, in order to maintain the output voltage as substantially constant.

Also in particular embodiments, any signal type related to the input and output of the boost-buck converter can be detected via control circuit 201 for utilization in controlling switches $Q_{11}$, $Q_{22}$, $Q_{33}$, and $Q_{44}$. For example, one or more of current, voltage, inductance, resistance, etc., related to the input and output of the boost-buck converter can be detected via control circuit 201. In one example, an input current can be compared against an output current in order to determine whether the boost-buck converter is to operate in a boost mode and/or a buck mode.

Thus in particular embodiments, by utilizing a parallel power conversion circuit structure, boost power conversion and buck power conversion can be realized based on input and output voltages of the boost-buck converter. Also, the boost-buck converter can operate alternatively or simultaneously in the boost and buck modes to satisfy output voltage requirements, and the converter may utilize only one control circuit. Therefore, a boost-buck converter of particular embodiments may have relatively high circuit integration and low costs. Also, during operation, conduction losses of the converter may be lower than other power conversion circuit approaches, which can effectively improve operating efficiency as compared to these approaches.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A method of controlling a boost-buck converter, the method comprising:
   a) receiving, by a control circuit, an input voltage from an input terminal of said boost-buck converter;
   b) receiving, by said control circuit, an output voltage from an output terminal of said boost-buck converter;
   c) controlling, by said control circuit, switching operations of first, second, third, and fourth switches of said boost-buck converter according to said input and output voltages such that said boost-buck converter operates in at least one of: a buck mode and a boost mode; and
   d) wherein said boost-buck converter comprises said first switch directly connected to said input terminal and to a first node, said second switch directly connected to said first node and to a ground terminal, a first inductor directly connected to said input terminal and to a second node, said third switch directly connected to said second node and to said ground terminal, said fourth switch directly connected to said second node and to said output terminal, and a second inductor directly connected to said first node and to said output terminal.

2. The method of claim 1, further comprising:
   a) controlling said third and fourth switches to be off, and controlling switching of said first and second switches such that said boost-buck converter operates in said buck mode when said input voltage is greater than said output voltage; and
   b) controlling said first and second switches to be off, and controlling switching of said third and fourth switches such that said boost-buck converter operates in said boost mode when said input voltage is less than said output voltage.

3. The method of claim 1, wherein said first and second inductors are two independent inductors.

4. The method of claim 1, wherein said first and second inductors are coupled inductors.

5. The method of claim 1, wherein:
   a) when said boost-buck converter operates in said boost mode, said first switch is configured to use reverse blocking; and
   b) when said boost-buck converter operates in said buck mode, said fourth switch is configured to use reverse blocking.

6. A boost-buck converter, comprising:
   a) a first switch directly connected to a first node and to an input terminal of said boost-buck converter;
   b) a second switch directly connected to said first node and to a ground terminal;
   c) a first inductor directly connected to said input terminal and to a second node;
   d) a third switch directly connected to said second node and to said ground terminal;
   e) a fourth switch directly connected to said second node and to an output terminal of said boost-buck converter;
   f) a second inductor directly connected to said first node and to said output terminal; and
   g) a control circuit configured to receive an input voltage from said input terminal and an output voltage from said output terminal, and to control switching operations of said first, second, third, and fourth switches according to said input and output voltages, such that said boost-buck converter operates in at least one of: a buck mode and a boost mode.

7. The boost-buck converter of claim 6, wherein:
   a) said control circuit is configured to control said third and fourth switches to be off, and switching of said first and second switches such that said boost-buck converter operates in said buck mode when said control circuit detects that said input voltage is greater than said output voltage; and
   b) said control circuit is configured to control said first and second switches to be off, and switching of said third and fourth switches such that said boost-buck converter operates in said boost mode when said control circuit detects that said input voltage is less than said output voltage.

8. The boost-buck converter of claim 6, wherein said first and second inductors are two independent inductors.

9. The boost-buck converter of claim 6, wherein said first and second inductors are coupled together.

10. The boost-buck converter of claim 6, wherein:
a) said first switch is configured to use reverse blocking when said boost-buck converter operates in said boost mode; and
b) said fourth switch is configured to use reverse blocking when said boost-buck converter operates in said buck mode.

11. The boost-buck converter of claim 6, further comprising an output capacitor directly connected to said output terminal and to said ground terminal.

12. The boost-buck converter of claim 6, wherein each of said first and second inductors is not directly connected to said ground terminal.

13. The boost-buck converter of claim 6, wherein said second inductor is directly connected to said output terminal with no other devices therebetween.

14. The method of claim 1, wherein said boost-buck converter comprises an output capacitor directly connected to said output terminal and to said ground terminal.

15. The method of claim 1, wherein each of said first and second inductors is not directly connected to said ground terminal.

16. The method of claim 1, wherein said second inductor is directly connected to said output terminal with no other devices therebetween.

\* \* \* \* \*